Nov. 29, 1955   C. F. HENDERSON ET AL   2,724,834
EYE SHADE ATTACHMENT FOR EYEGLASSES
Filed Aug. 25, 1953

Charles F. Henderson
Marguerite M. Henderson
INVENTORS.

BY *Clarence A. O'Brien*
*and Harvey B. Jackson*
Attorneys

2,724,834

EYE SHADE ATTACHMENT FOR EYEGLASSES

Charles F. Henderson and Marguerite M. Henderson, Bangor, Pa.

Application August 25, 1953, Serial No. 376,382

1 Claim. (Cl. 2—13)

The present invention relates to new and useful improvements in eye shades adapted for attaching to the usual temple bars of eyeglasses.

An important object of the invention is to provide a pair of brackets adapted for slidably mounting on the temple bars, and pivotally attaching an eye shade to the brackets for swinging the eye shade vertically from a horizontal forwardly projecting position in front of the eyes into a raised position above the eyes when the eye shade is not needed and without detaching the same from the eyeglasses.

Another object is to provide a device of this character of simple and practical construction, which is efficient and reliable in operation, neat and attractive in appearance, inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
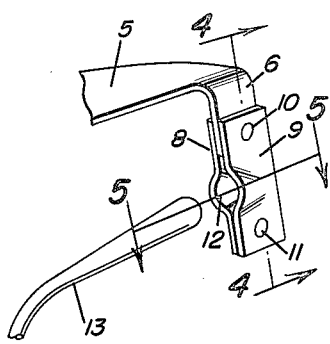
Figure 4:
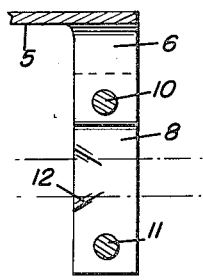
Figure 5:
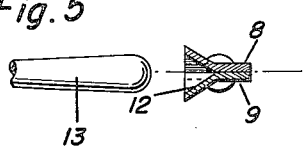

Figure 3 is an enlarged fragmentary group perspective view of one of the brackets, and Figures 4 and 5 are enlarged sectional views taken respectively on the lines 4—4 and 5—5 of Figure 3.

Referring now to the drawing in detail, wherein for the purpose of illustration we have disclosed a preferred embodiment of our invention, the numeral 5 designates an eye shade of plastic or other suitable materal and is of substantially arcuate shape to conform to the contour of a person's forehead and is formed at its rear side portions with downwardly extending tongues 6. Each tongue 6 is pivotally mounted on a bracket designated generally at 7 and which is composed of a pair of elongated resilient plastic plates 8 and 9 secured to each other in confronting relation by upper and lower rivets or pins 10 and 11 and to the former of which the adjacent tongue 6 is pivoted between the plates.

A flared opening 12 is formed at the forward edges of plates 10 and 11 to receive the temple bars 13 of eyeglasses 14 to slidably mount the eye shade thereon.

Figure 1:
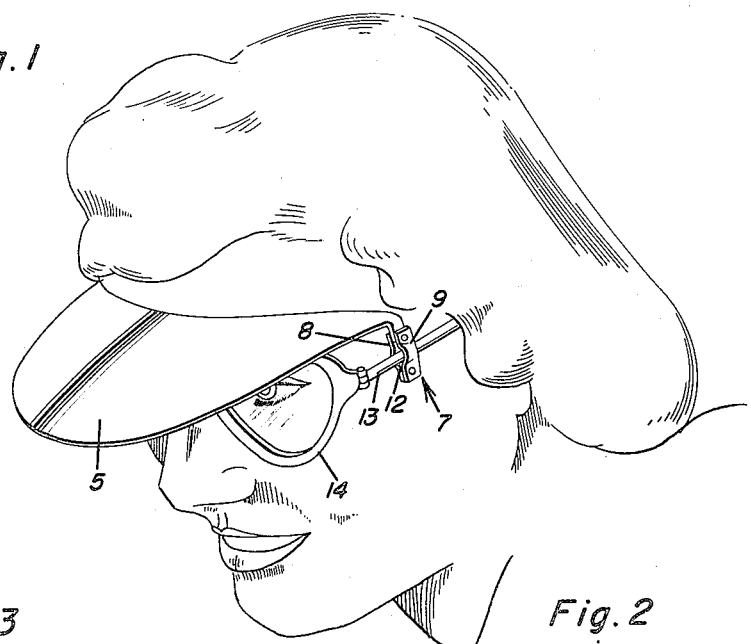
Figure 1 is a perspective view showing the eye shade lowered.
Figure 2:
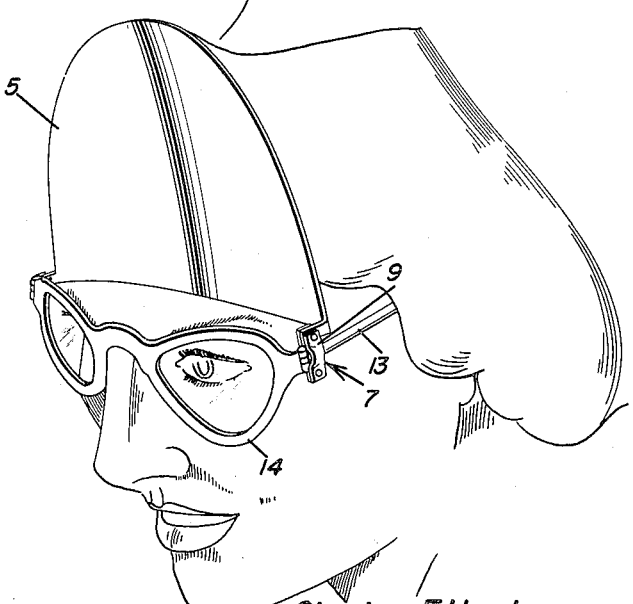
Figure 2 is a similar view showing the eye shade raised.

The device is mounted on the eyeglasses by sliding the temple bars 13 in the openings 12 of brackets 7 to position the brackets adjacent the eyeglasses. The shade or shield 5 is then free to swing either into a horizontal position overlying the eyeglasses, as shown in Figure 1, or into a raised vertical position, when not desired for shading the eyes, as shown in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An eye shade comprising an arcuate eye shielding member adapted for resting in a horizontal position on the upper edge of an eyeglass frame, tongues integrally formed with and extending downwardly at the rear side portions of said eye shielding member, brackets adapted for slidable mounting on the temple bars of the eyeglass frame, said brackets comprising a pair of resilient plates secured to each other in confronting relation and with a portion of each plate free for spreading movement relative to each other, and said brackets having a flared opening at the front edges of the free portion of the plates to guide the temple bars between the plates for friction gripping engagement of the temple bars in the openings and means pivotally connecting the brackets to the tongues for swinging the eye shielding member into and out of an upstanding position rearwardly past center of the pivot means to support the eye shielding member in its raised position.

References Cited in the file of this patent

UNITED STATES PATENTS

| 2,224,560 | Wentz | Dec. 10, 1940 |
| 2,286,219 | Martinek | June 16, 1942 |

FOREIGN PATENTS

| 860,527 | Germany | Dec. 22, 1952 |